(12) United States Patent
Yang et al.

(10) Patent No.: US 10,693,713 B1
(45) Date of Patent: Jun. 23, 2020

(54) METHOD AND APPARATUS FOR PROVIDING SERVICE COVERAGE WITH A MEASUREMENT-BASED DYNAMIC THRESHOLD ADJUSTMENT

(71) Applicant: AT&T Intellectual Property I, L.P., Atlanta, GA (US)

(72) Inventors: Wen Yang, Bellevue, WA (US); Ye Chen, Milton, GA (US); Arthur Brisebois, Cumming, GA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/282,372

(22) Filed: Feb. 22, 2019

(51) Int. Cl.
*H04W 24/08* (2009.01)
*H04L 12/24* (2006.01)
*H04W 24/10* (2009.01)
*H04L 12/26* (2006.01)
*H04W 24/02* (2009.01)
*H04W 84/04* (2009.01)

(52) U.S. Cl.
CPC .......... *H04L 41/0677* (2013.01); *H04L 43/16* (2013.01); *H04W 24/02* (2013.01); *H04W 24/10* (2013.01); *H04W 84/042* (2013.01)

(58) Field of Classification Search
CPC .... H04L 41/0677; H04L 43/16; H04W 24/02; H04W 24/10; H04W 84/042
USPC .......................................................... 455/423
See application file for complete search history.

(56) References Cited

U.S. PATENT DOCUMENTS

| | | | |
|---|---|---|---|
| 2002/0068571 A1* | 6/2002 | Ohlsson ................ | H04W 36/18 455/442 |
| 2006/0239231 A1* | 10/2006 | Hong .................... | H04W 36/24 370/331 |
| 2009/0186626 A1* | 7/2009 | Raghothaman ......... | H04J 13/00 455/452.2 |
| 2015/0036658 A1* | 2/2015 | Mochizuki ............ | H04W 24/10 370/331 |
| 2015/0189519 A1* | 7/2015 | Hoglund ................ | H04W 16/08 455/424 |
| 2017/0332325 A1* | 11/2017 | Nan ..................... | H04W 72/042 |
| 2018/0192311 A1* | 7/2018 | Zeng .................... | H04W 36/06 |
| 2018/0205517 A1* | 7/2018 | Shao .................... | H04L 27/144 |
| 2019/0215888 A1* | 7/2019 | Cirik ..................... | H04B 7/0695 |
| 2019/0320372 A1* | 10/2019 | Zhang ................ | H04W 36/0069 |

\* cited by examiner

*Primary Examiner* — Nathan S Taylor
(74) *Attorney, Agent, or Firm* — Gustin & Gust, PLC; Mark Wilinski

(57) ABSTRACT

Aspects of the subject disclosure may include, for example, identifying a first application executed by a user equipment, computing a first metric associated with an uplink between the user equipment and a base station over a first network, comparing the first metric with a second metric associated with the execution of the first application by the user equipment, and responsive to the comparing, causing the user equipment to connect to the base station via a second network that is different from the first network. Other embodiments are disclosed.

20 Claims, 10 Drawing Sheets

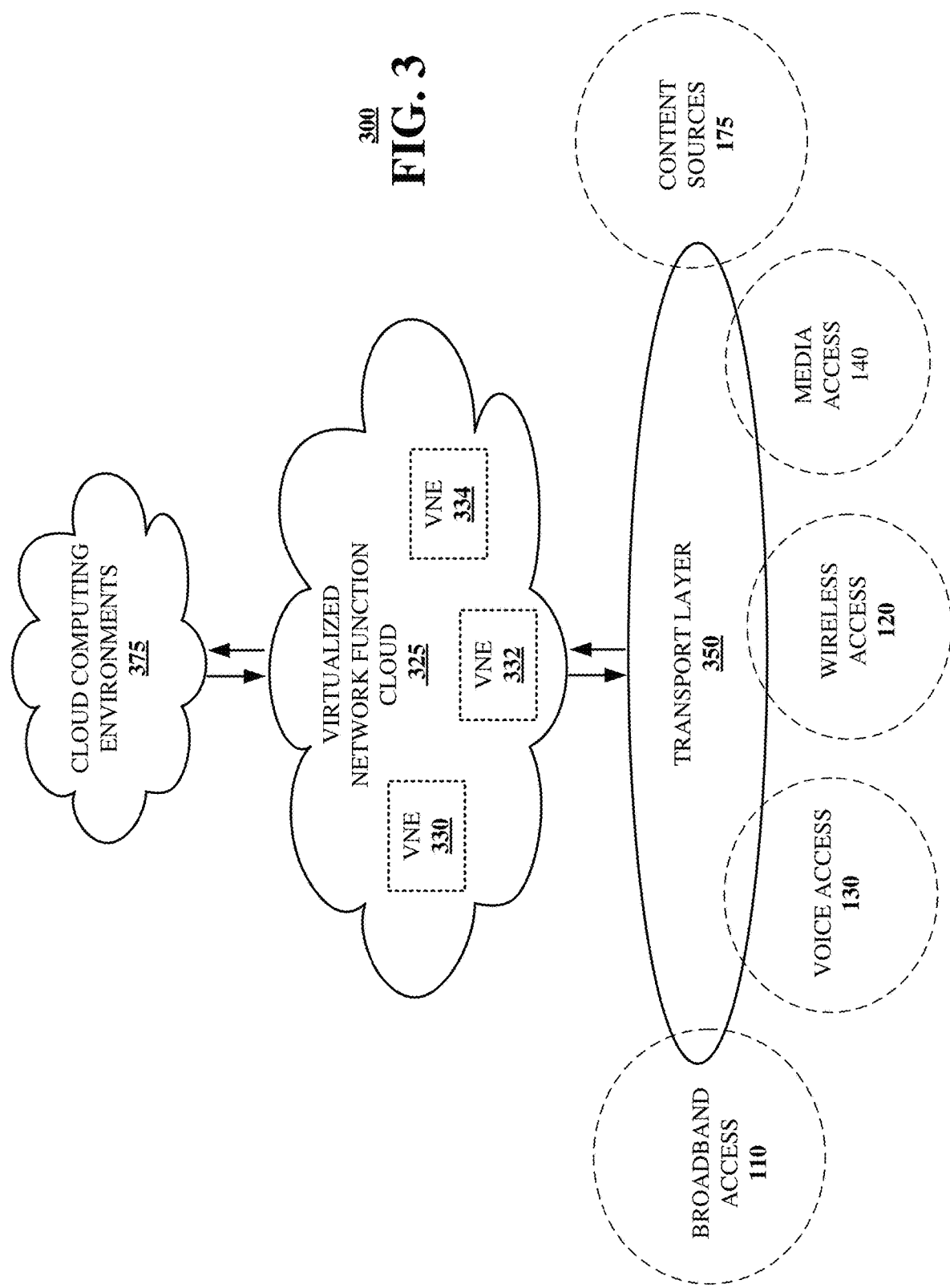

US 10,693,713 B1

METHOD AND APPARATUS FOR PROVIDING SERVICE COVERAGE WITH A MEASUREMENT-BASED DYNAMIC THRESHOLD ADJUSTMENT

FIELD OF THE DISCLOSURE

The subject disclosure relates to a method and apparatus for providing service coverage with a measurement-based dynamic threshold adjustment.

BACKGROUND

As the world continues to become increasingly connected, service providers and network operators continue to develop resources and infrastructure to accommodate the proliferation of user equipment (UE) connecting to services and networks. For example, such development may be aimed at enhancing the user experience while connected to such services/networks. If a UE encounters difficulty in connecting to services/networks, such difficulty may tend to degrade the user experience. Furthermore, difficulty in connecting to a service/network may tend to expend a power source (e.g., a battery) of the UE and cause the UE to crash or reboot. Still further, there are various UEs with varying capabilities (e.g., antenna capabilities, transmitter power capabilities, etc.). Each of these UEs require reliable service over a large range of radio coverage and qualities conditions.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for adapting a threshold for attempting to connect, and connecting, a user equipment to a network. Other embodiments are described in the subject disclosure.

One or more aspects of the subject disclosure include computing a first metric associated with a quality of an uplink between a user equipment and the device over a 5G network, computing a second metric associated with the quality of the uplink subsequent to the computing of the first metric, determining that there is a fault in the uplink, and responsive to the determining, computing a difference between the first metric and the second metric to generate an offset that is obtained by the user equipment for reconnecting the user equipment and the device over the 5G network.

One or more aspects of the subject disclosure include configuring a processing system with a first threshold associated with a connecting of the processing system to a network element over a 5G network, receiving a downlink transmission from the network element, detecting that the downlink transmission has a power level that is greater than the first threshold, responsive to the detecting, connecting the processing system to the network element over the 5G network, receiving an indication of an offset from the network element subsequent to the connecting of the processing system to the network element over the 5G network, wherein the receiving of the indication of the offset is based on a link failure between the processing system and the network element over the 5G network, and responsive to the receiving of the indication of the offset, configuring the processing system with a second threshold associated with the connecting of the processing system to the network element over the 5G network, wherein the second threshold is different from the first threshold.

One or more aspects of the subject disclosure include identifying, by a processing system including a processor, a first application executed by a user equipment, computing, by the processing system, a first metric associated with an uplink between the user equipment and a base station over a first network, comparing, by the processing system, the first metric with a second metric associated with the execution of the first application by the user equipment, and responsive to the comparing, causing, by the processing system, the user equipment to connect to the base station via a second network that is different from the first network.

Figure 1:
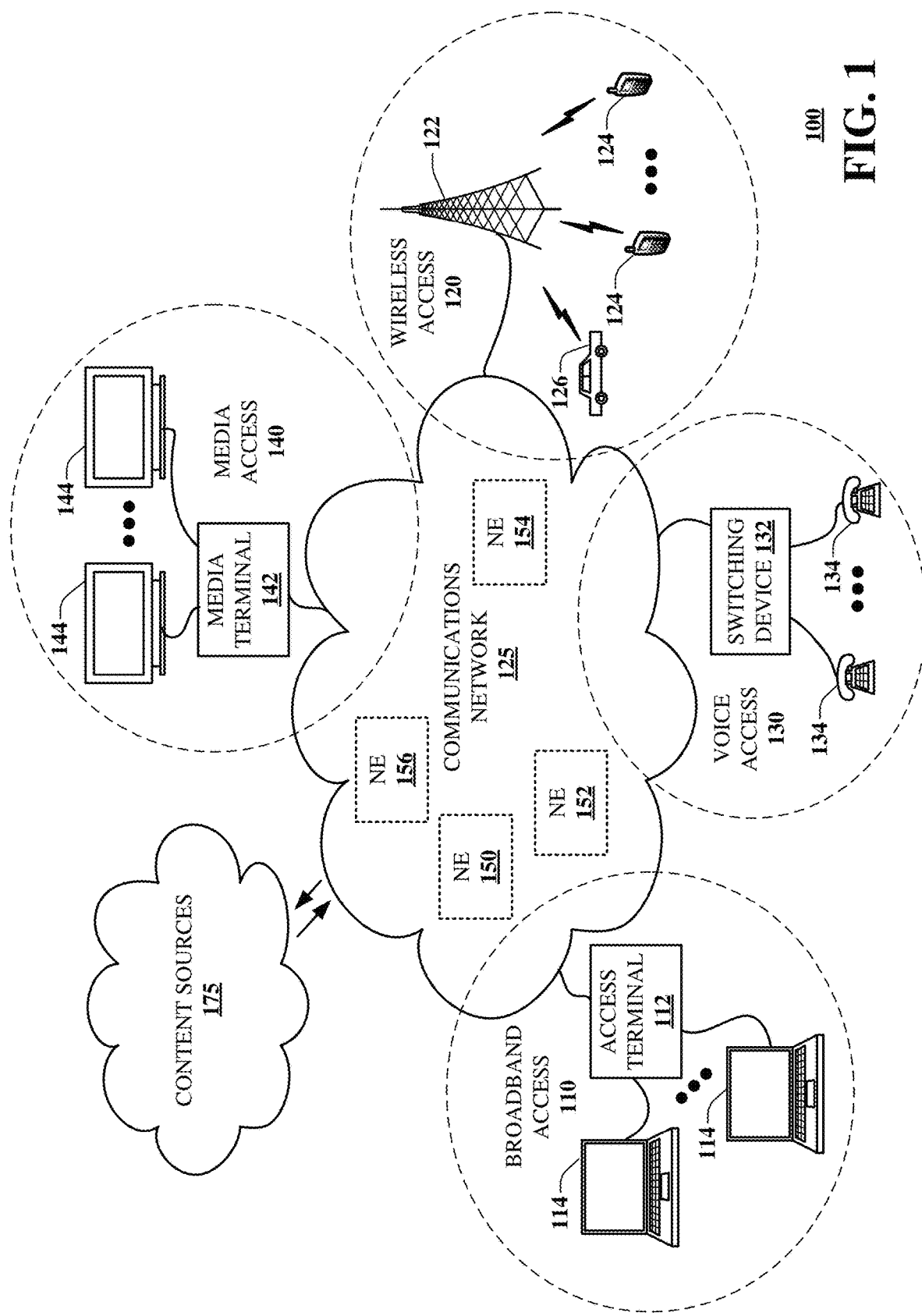
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part computing a first metric associated with a quality of an uplink between a user equipment and the device over a 5G network, computing a second metric associated with the quality of the uplink subsequent to the computing of the first metric, determining that there is a fault in the uplink, and responsive to the determining, computing a difference between the first metric and the second metric to generate an offset that is obtained by the user equipment for reconnecting the user equipment and the device over the 5G network.

As shown in FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
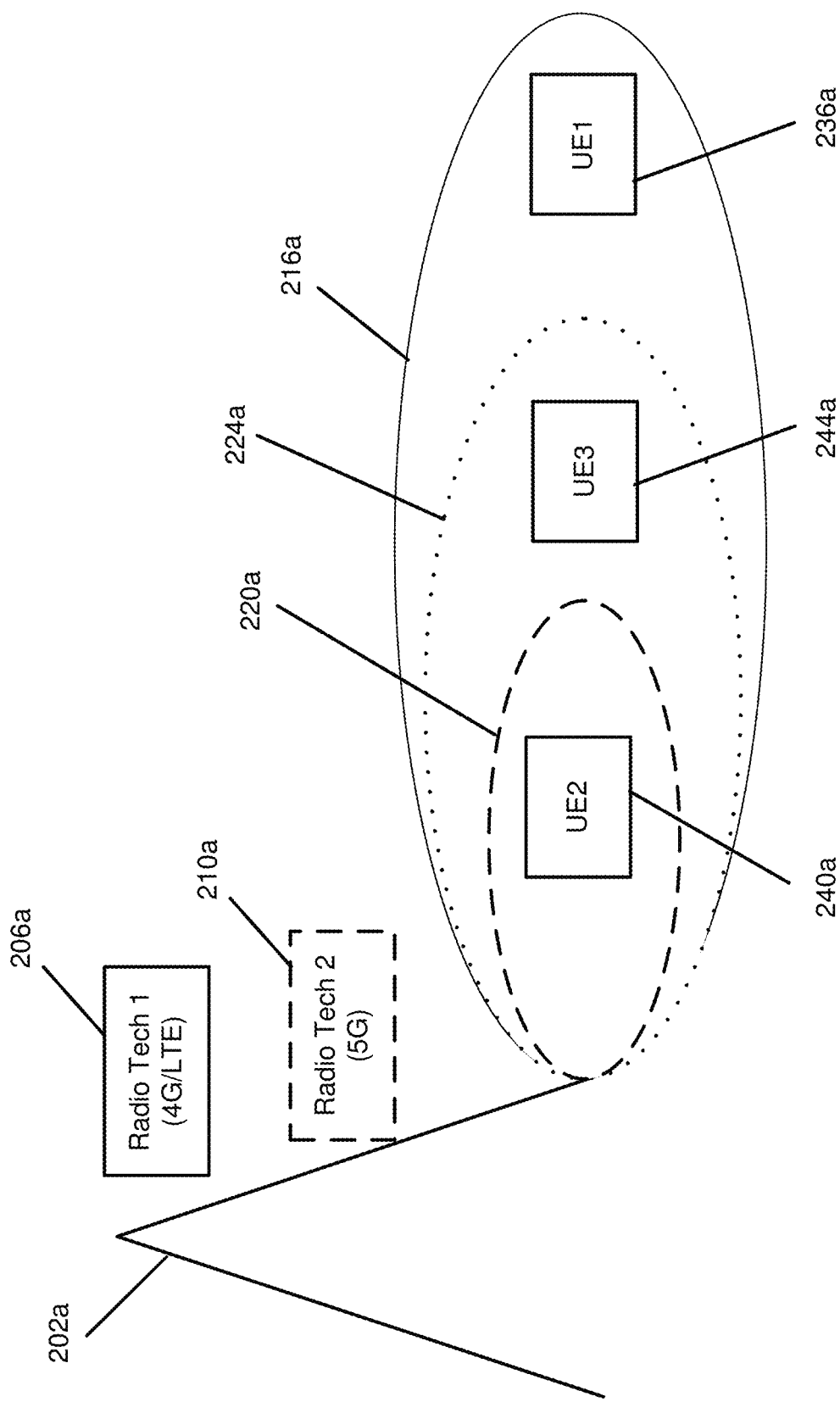
FIGS. 2A-2B are block diagrams illustrating exemplary, non-limiting embodiments of systems functioning within the communication network of FIG. 1 in accordance with various aspects described herein.

FIG. 2A is a block diagram illustrating an example, non-limiting embodiment of a system 200a functioning within the communications network 100 of FIG. 1 in accordance with various aspects described herein. For example, the system 200a may be used to provide user equipment with services and/or network connectivity as described further below.

The system 200a may include network components/infrastructure, such as for example a base station/tower 202a. The base station 202a may be operative in conjunction with one or more technologies or networks. For example, and as represented by the blocks 206a and 210a, the base station 202a may be operative in conjunction with a first radio technology 206a and a second radio technology 210a. In an illustrative embodiment, the first radio technology 206a may be operative in accordance with 4G and/or LTE technology and the second radio technology 210a may be operative in accordance with 5G technology.

The base station 202a may provide different zones (e.g., cells) of coverage/service to user equipment (UE) based on the technologies (e.g., technologies 206a and 210a) supported by the base station 202a. For reasons that will become clearer below, FIG. 2A illustrates three such zones of coverage as a first zone 216a, a second zone 220a, and a third zone 224a.

In some embodiments, the zones 216a-224a may be defined in accordance with one or more parameters. For example, the parameters may include a geographical distance (measured relative to, e.g., the base station 202a or other network component), a line of sight (LOS) between a UE and the base station 202a, signal fading, a quality of service (QoS) parameter, an identification of one or more services provided to the UE, an identification of an application or program executed by the UE, an identification of a type of communication session that the UE is engaged in, a power state/condition of the UE (e.g., whether the UE has a low battery), network loads/traffic, a time of day or day of week, etc.

FIG. 2A illustrates three UEs (namely, UE1 236a, UE2 240a, and UE3 244a) as part of the system 200a. While three UEs are shown in FIG. 2A, in some embodiments the base station 202a may provide service for a different count of (e.g., more than three) UEs. Additionally, while the UEs 236a-244a are shown as separate/distinct UEs in FIG. 2A, in some embodiments two or more of the UEs 236a-244a may correspond to the same UE at different points in time. For example, a UE may migrate or be relocated from a first location at a first point in time to a second location at a second point in time. To demonstrate, a mobile device may be located at the position of UE1 236a shown in FIG. 2A at a first point in time, and that same mobile device may be located at the position of UE2 240a shown in FIG. 2A at a second, later point in time.

In terms of providing service/connectivity to the UEs 236a-244a, and continuing the above example where the first technology 206a corresponds to 4G/LTE and the second technology 210a corresponds to 5G, it may be desirable in some (e.g., many) instances to utilize 5G 210a when possible. However, the scope/reach of 5G coverage tends to be smaller than LTE coverage due to spectrum allocation. Thus, in some instances, it might not be possible to utilize 5G technology. For example, the UE1 236a may be located outside of the 5G zone of coverage (e.g., zone 220a) supported by the base station 202a, while located inside the 4G/LTE zone of coverage (e.g., zone 216a) supported by the base station 202a, such that the UE1 236a may connect to the base station 202a using 4G/LTE technology. Conversely, the UE2 240a may be located within the 5G zone of coverage 220a, such that the UE2 may connect to the base station 202a using 5G technology.

As shown in FIG. 2A, the UE3 244a may be located outside of the zone 220a yet within the zone 224a. Within the zone 224a, the 5G downlink (DL) coverage may be acceptable for the UE3 244a; however, the 5G uplink (UL)

coverage might not be acceptable for the UE3 244a. This asymmetry in DL and UL coverage may be at least partially a result of a difference in transmission powers in the DL and UL directions. For example, the base station 202a may transmit in the DL direction (e.g., from the base station to the UE) at a first level of power and the UE (e.g., UE3 244a) may transmit in the UL direction (e.g., from the UE to the base station) at a second level of power that is less than the first level of power. Additionally, the asymmetry in DL and UL coverage may be at least partially based on the number of components/resources (e.g., transmitters, antennas, etc.) at the base station 202a being greater than the number of components/resources available at the UE.

In terms of the determination/decision as to which technology (e.g., 4G/LTE 206a or 5G 210a) to use for connecting a UE (e.g., the UE3 244a) to the base station 202a, that determination/decision has conventionally/traditionally been based on a DL measurement relative to a threshold, such as for example a reference signal receive power (RSRP) threshold, a reference signal received quality (RSRQ) threshold, etc. The implication of basing the determination/decision on the DL measurement is that in some instances a UE (e.g., the UE3 244a) may obtain adequate DL coverage to support using, e.g., 5G, but the 5G coverage may be inadequate in the UL direction. Thus, the UE3 244a may be triggered to use 5G when located within the zone 224a as shown in FIG. 2A. However, since the UE3 244a may be outside of the 5G UL coverage (where the 5G UL coverage is represented by the (boundary of the) zone 220a), the UL messages transmitted by the UE3 244a to the base station 202a using 5G might not be received by the base station 202a (or may be received by the base station 202a at a quality that is less than a threshold).

Based on the lack of/poor quality UL messages received from the UE3 244a using 5G, the base station 202a (or another network component) may declare a 5G link failure with respect to the UE3 244a in an effort to cause the UE3 244a to connect to the base station 202a via a 4G/LTE link. However, the DL transmission power may continue to be sufficient such that the UE3 244a may again be triggered for connecting to the base station 202a via a 5G link. This pattern of attempted 5G connections and declarations of 5G link failures may repeat, resulting in oscillations/instabilities in terms of the UE3 244a's connection to the base station 202a. The instability/oscillation may result in very low throughput, expenditure of power (e.g., battery drain), UE crashes/reboots, and a poor user experience.

In an effort to mitigate the impact of the scenario described above where a UE oscillates in terms of the technology used to connect to a base station or network, the determination/decision as to which technology to use may be based on an adaptive threshold. To demonstrate the use of an adaptive threshold, reference may be made to the system 200b shown in FIG. 2B. The system 200b may incorporate aspects of the system 200a of FIG. 2A in some embodiments. Still further, the operation of the system 200b is described below in conjunction with the method 200c of FIG. 2C. One skilled in the art will appreciate, based on a review of this disclosure, that aspects of the system 200b may be practiced/implemented using methods other than the method 200c. Similarly, aspects of the method 200c may be implemented/executed using systems and devices other than those shown and described in connection with the system 200b.

Figure 2B:
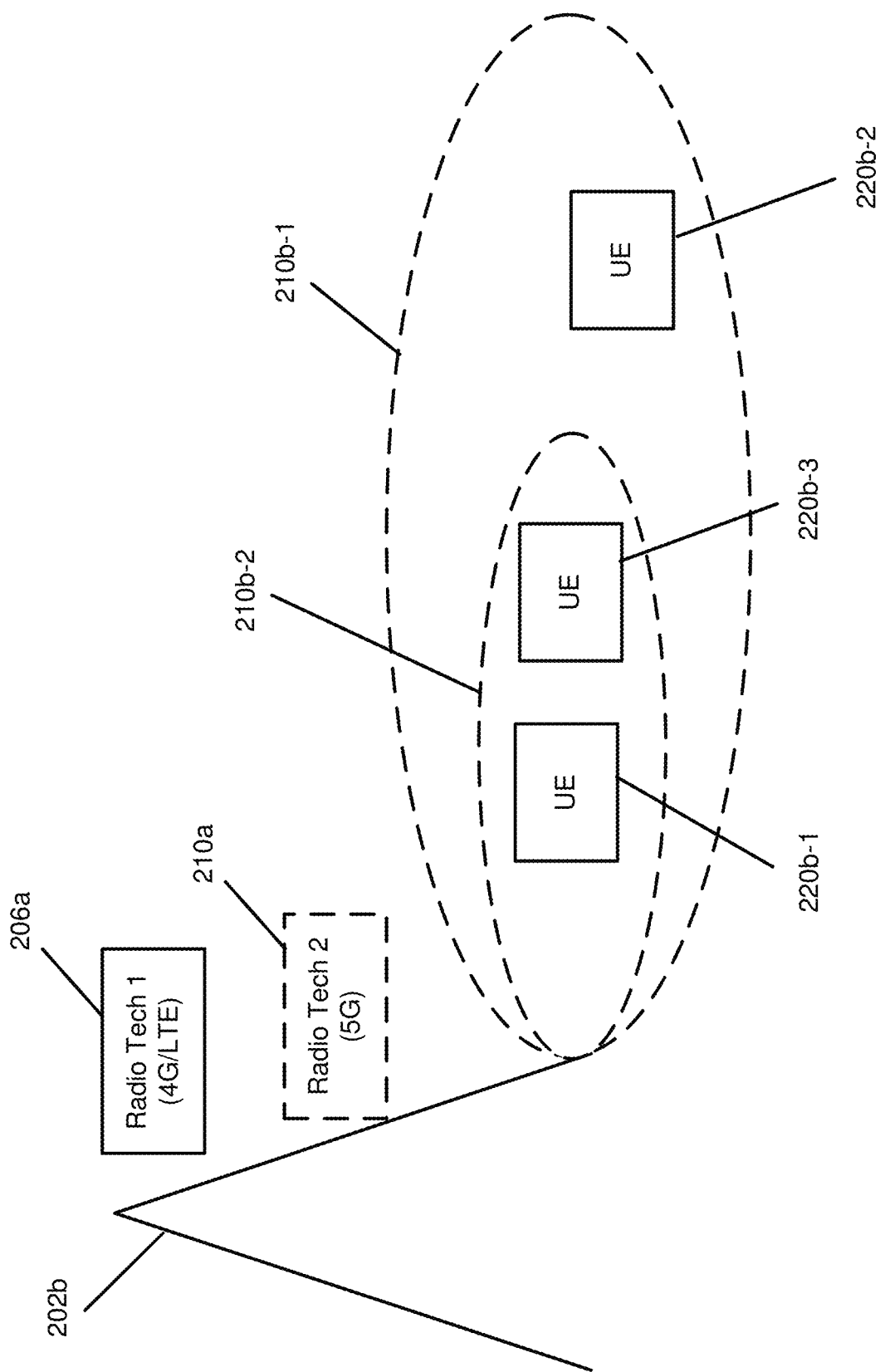

As shown in FIG. 2B, the system 200b may include a base station 202b (which may correspond to the base station 202a of FIG. 2A) that may support 4G/LTE 206a networking and 5G 210a networking. An initial threshold may be established for connecting to the 5G network 210a as represented by the boundary of the zone 210b-1 (see also block 202c of FIG. 2C). The value for the initial threshold associated with the boundary of the zone 210b-1 may be based on DL power transmission levels. For example, the value of the initial threshold may be selected based on experience/testing and may be based on an ability of a UE (e.g., a UE of a given make or model number) to potentially detect a DL transmission over the 5G network. The value for the initial threshold may be based on an identification of an application or communication session that the UE is engaged in; for example, text messages may be more suitable for use on a 5G network relative to a videoconference due to the need for smooth playback/lack of interruptions in the videoconference context. In this respect, and all other conditions being equal, the zone 210b-1 may be larger for text messaging relative to videoconferencing.

As shown in block 206c, the UE may be configured with the initial threshold. For example, the UE may be configured with the initial threshold (1) as part of, e.g., a parameter in an RRC message transmission (e.g., an LTE DL transmission) to the UE, or (2) via some other technique.

In connection with this example, it may be assumed that the UE is initially located at a first position represented by reference character 220b-1, and that when in the first position 220b-1 that the UE is within the scope of DL coverage provided by the 5G network 210a. In this regard, when at the first position 220b-1 the UE may report to the base station 202b when the threshold is met as shown in block 208c, and the UE may connect to the 5G network 210a as shown in block 210c.

As part of the connection to the 5G network when the UE is at the first position 220b-1, the base station 202b (or another network element/device) may compute or determine an uplink signal to noise ratio (SNR) value (or, analogously, a signal to interference plus noise ratio (SINR) value) for the UE in the UL direction as shown in block 214c. That SNR value (or SINR value) may be saved/stored by, e.g., the base station 202b. Assuming that the SNR value (or SINR value) is "good" (e.g., greater than some value), the data transfer/link between the base station 202b and the UE on the 5G network may persist without radio link failure (or may persist with link failures that are less than some specified value, potentially as a function of time).

At a subsequent point in time, the UE may migrate/relocate from the first position 220b-1 to a second position represented by the reference character 220b-2. When the UE is located at the second position 220b-2, the base station (or the another network element/device) may continue to monitor the UE UL SNR value for the UE in the UL direction as shown in block 214c. Assuming that the SNR value (or the SINR value) turns "bad" (e.g., is less than some value), the quality of the data transfer/link between the base station 202b and the UE on the 5G network may degrade to such an extent that there may be intermittent 5G radio link failures that are experienced. If the radio link failures occur often enough (in terms of absolute number/count, in terms of failures as a function of time, etc.) as determined in block 222c, the base station 202b may decide a new threshold is needed for the UE as shown in block 226c. Otherwise, flow of the method 200c may proceed from block 222c to block 206c and the base station 202b may configure the UE with the initial threshold at the time of moving the UE to 4G/LTE It is noted that a radio link failure/fault may be declared by, e.g., the base station 202b in block 222c even when the UE is located within the perimeter/boundary of the zone

210*b*-1 associated with the initial threshold. This could be due to any number of factors, such as for example a degraded transmitter or antenna in the UE, an obstruction in the LOS between the UE and the base station 202*b*, network congestion on the 5G network, etc.

Upon the 5G radio link failure, the base station 202*b* may (attempt to) move the UE to the 4G/LTE network assuming that such a network is available. The base station 202*b* may then configure the UE with 5G threshold for re-entry.

Figure 2C:
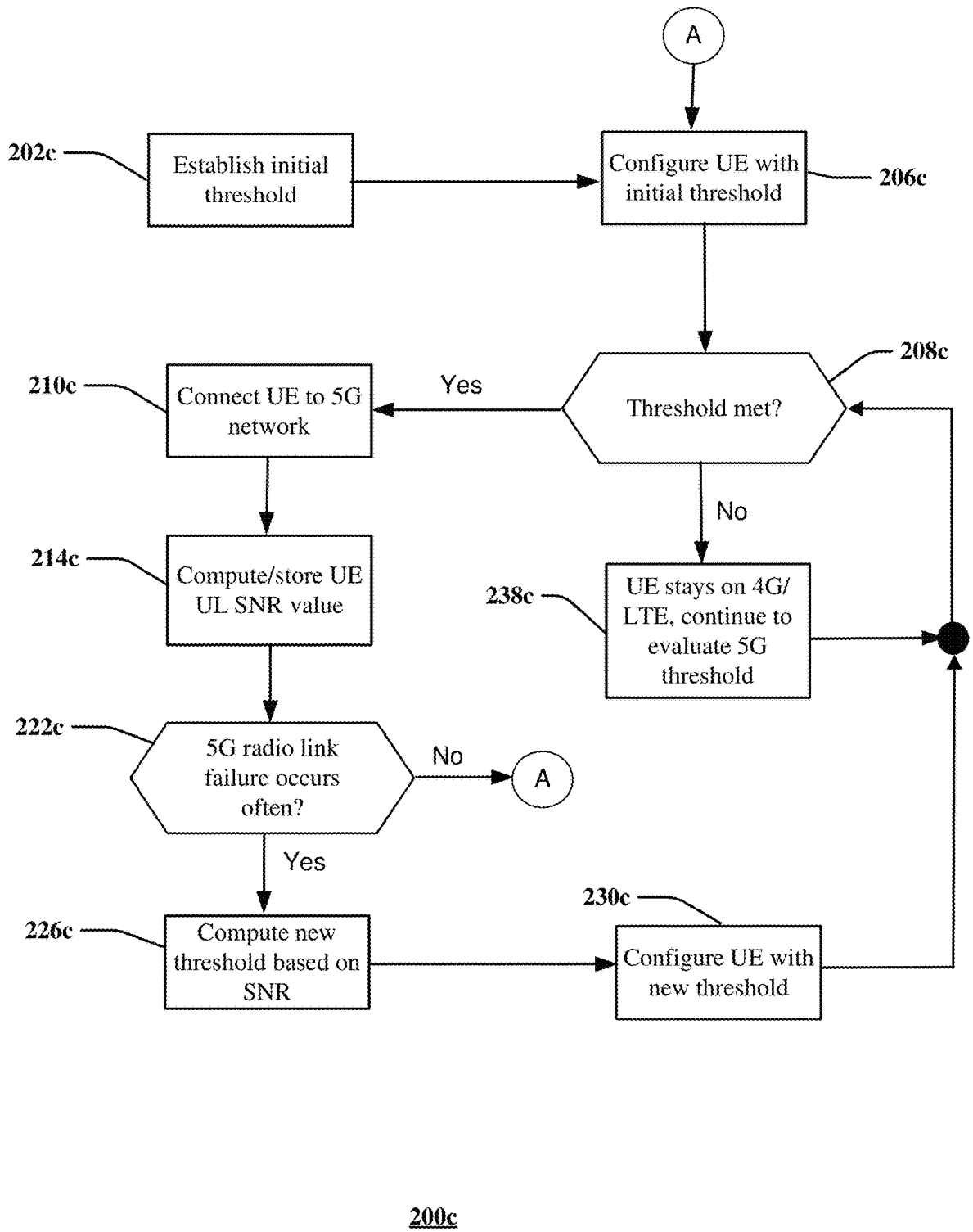
FIGS. 2C-2E depict illustrative embodiments of methods in accordance with various aspects described herein.

As part of the new threshold calculation in block 226*c*, or in response thereto as represented in FIG. 2C, the base station 202*b* may compute a difference between the actual SNR value (e.g., the SNR value computed in block 214*c*) and a target SNR value as shown in block 226*c*. This difference in the SNR values (or, analogously, in SINR values) may be used to establish the new 5G threshold to be configured to the UE after 5G radio link failure as shown in block 230*c*.

In block 226*c*, the UE may transform the difference in the SNR values into an offset that is applied to the initial threshold (of block 206*c*) in computing/determining a new threshold. This new threshold may be associated with a boundary of the zone 210*b*-2 shown in FIG. 2B. As long as the UE remains near/proximate the location 220*b*-2, the UE may detect a DL transmit power level that is less than the new threshold as part of block 238*c*. When the UE detects that the DL transmit power level is less than the new threshold, the UE will not be reconnected to the 5G network and flow of the method 200*c* may continue at block 238*c*.

Assuming that the UE is relocated from the second position 220*b*-2 to a third position 220*b*-3 that is within the zone 210*b*-2, the UE may detect a DL transmit power that is greater than the new threshold in block 238*c*. Responsive to detecting the DL transmit power greater than the new threshold in block 208*c*, the UE may then reconnect to the 5G network as shown in block 210*c*.

The 5G link failures/faults were described above (in connection with block 222*c*) as being based on (e.g., caused by) UE mobility. While mobility is one factor that can contribute to link failure/fault, other factors (taken alone, or in combination with one another) may cause a link fault/failure. Such other factors may include obstructions in a line of sight (LOS), changes in component quality (e.g., transmitter, receiver, antenna degradation over time), changes (e.g., an increase) in network traffic/congestion, etc. In this respect, a link failure/fault in a network may occur even in instances where a UE is stationary.

As described above, the difference in SNR values (or, analogously, the difference in SINR values) may be reported to the UE to enable the UE to compute an offset relative to the initial threshold (see block 226*c*). In some embodiments, the base station 202*b* may compute the offset based on the difference in SNR values (or SINR values) and use the offset to calculate the new threshold and configure the UE as part of block 230*c*. In some embodiments, a mapping between an offset and the difference in SNR values (or SINR values) may be established based on testing/experience. This mapping may be stored in one or more storage devices (e.g., a database, a memory, etc.) that may be accessed by a given system or device (e.g., a base station, a UE, etc.).

In some embodiments, rather than using the full amount of the difference of the SNR values (or, analogously, the SINR values) in computing the offset, a fractional share/portion of the difference of the SNR values may be used. For example, rather than using 100% of the difference of the SNR values to compute the offset, 50% of the difference of the SNR values may be used to compute the offset. By using a fraction of the difference of the SNR values, that may have a tendency to encourage the UE to reconnect to the 5G network sooner than if the full difference of the SNR values was used. It may be desirable to encourage such 5G reconnection sooner under a variety of circumstances, such as for example when a secondary network (e.g., 4G/LTE) is experiencing excessive traffic/congestion, when an application executed by the UE performs better when using 5G relative to the secondary network, etc. In this respect, a tradeoff may be made between reducing (e g, minimizing) UE oscillations or link faults in terms of network connectivity on the one hand and overall network/service management considerations on the other hand.

As described above, it can be difficult to select an appropriate threshold for a particular UE to connect to a particular network given the variety of factors (e.g., dynamic factors) that impact the ability for the UE to stay connected to the network. Aspects of the disclosure address this difficulty by providing an algorithm/methodology to not only select, but adjust, a value of that threshold in response to changing conditions. Accordingly, both UE and network infrastructure performance is enhanced by reducing (e.g., minimizing) the number of times a UE connects or reconnects to (or, analogously, drops off of) a given network (potentially as a function of time).

In some embodiments, execution of a given application by, e.g., a UE may have a predetermined target SNR value (or, analogously, SINR value) associated with it. For example, a first application may have a first target SNR value and a second application may have a second target SNR value; the second target SNR value may be the same as, or different from, the first target SNR value. A target SNR value may be determined based on experience/testing, one or more user surveys, etc. The target SNR value may be selected to ensure that a user experience or QoS parameter is above a predetermined threshold.

Figure 2D:
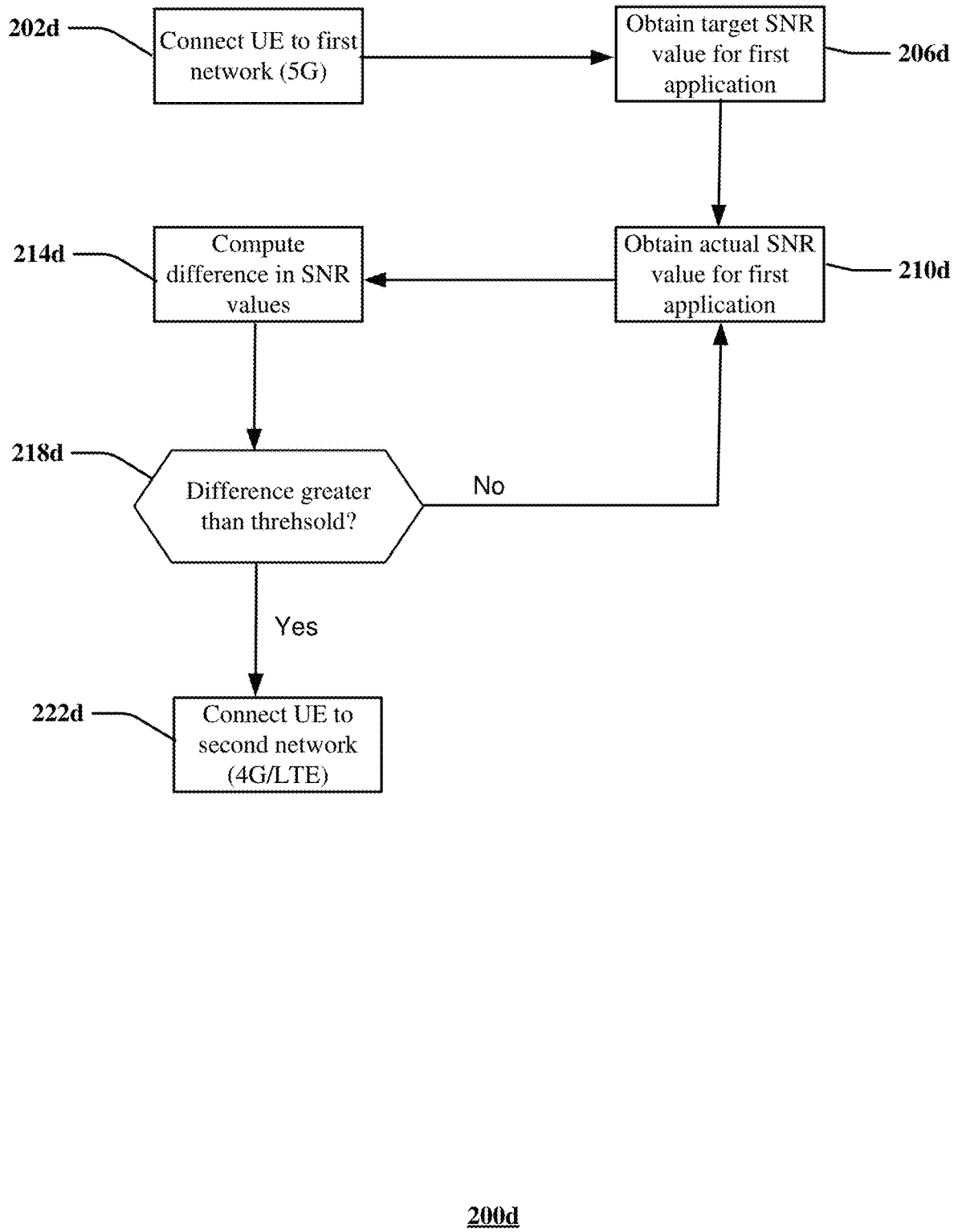

Referring now to FIG. 2D, a method 200*d* is shown for potentially connecting a UE to one or more networks based on a difference in actual and target SNR values (or, analogously, a difference in actual and target SINR values).

In block 202*d*, a UE may be connected to a first network. For example, the UE may be connected to a 5G network as described above in connection with the method 200*c* of FIG. 2C.

In block 206*d*, a target SNR value for a first application executed by the UE may be obtained.

In block 210*d*, an actual SNR value for an execution of the first application over/in the first network may be obtained. For example, the actual SNR value may be obtained in block 210*d* based on the use of the method 200*c* of FIG. 2C.

In block 214*d*, a difference between the target SNR value of block 206*d* and the actual SNR value of block 210*d* may be computed.

In block 218*d*, the difference computed in block 214*d* may be compared to a threshold. If the magnitude of the difference is greater than a threshold (and if the actual SNR value is less than the target SNR value), the UE may be connected to a second/different network (e.g., a 4G/LTE network) in block 222*d*; otherwise, flow may proceed from block 218*d* to block 210*d* to continue obtaining actual SNR values for the first application in relation to the first network.

In this respect, the comparison of the actual and target SNR values in conjunction with blocks 214*d* and 218*d* may be used as a proxy for assessing the quality of the link in the first network (e.g., the 5G network). The difference in actual and target SNR values may continue to be monitored based on, e.g., the loop established between blocks 218*d* and 210*d*.

If the difference becomes too large (e.g., the actual SNR value is substantially less than the target SNR value) as represented by the flow from block 218d to block 222d, the UE may be instructed to connect to the second network. By instructing the UE to connect to the second network (in advance of a link failure/fault in relation to the first network), continuity in the execution of the first application may be obtained. Such continuity may be of importance where the first application is determined to be a 'critical' application or where interruptions in the execution of the first application cannot be tolerated.

Figure 2E:
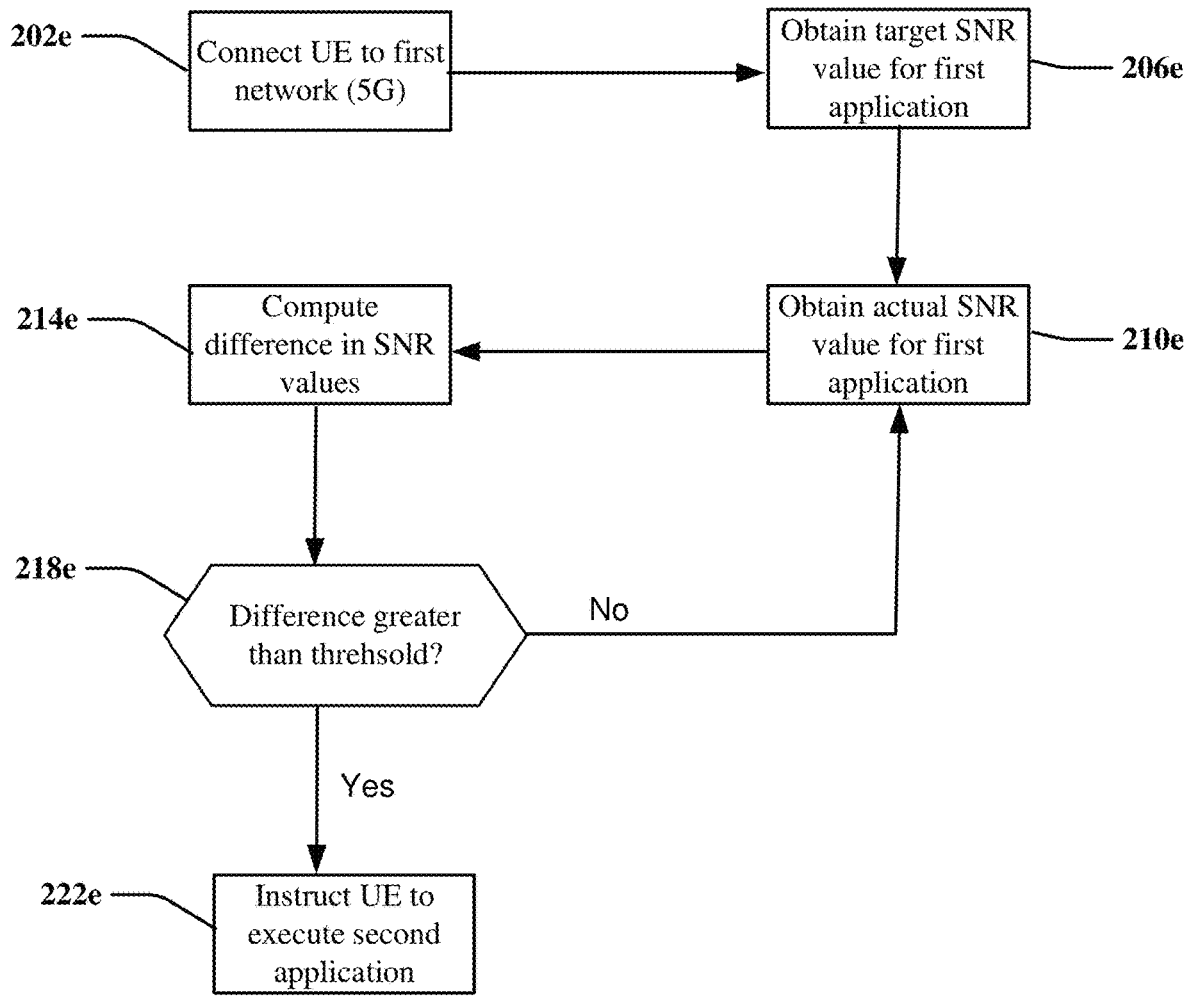

Referring now to FIG. 2E, a method 200e is shown where a UE potentially executes more than one application based on a difference in actual and target SNR values (or, analogously, a difference in actual and target SINR values).

In block 202e, a UE may be connected to a first network. For example, the UE may be connected to a 5G network as described above in connection with the method 200c of FIG. 2C.

In block 206e, a target SNR value for a first application executed by the UE may be obtained.

In block 210e, an actual SNR value for an execution of the first application over/in the first network may be obtained. For example, the actual SNR value may be obtained in block 210e based on the use of the method 200c of FIG. 2C.

In block 214e, a difference between the target SNR value of block 206e and the actual SNR value of block 210e may be computed.

In block 218e, the difference computed in block 214e may be compared to a threshold. If the magnitude of the difference is greater than a threshold (and if the actual SNR value is less than the target SNR value), the UE may be instructed to execute a second application in block 222e; otherwise, flow may proceed from block 218e to block 210e to continue obtaining actual SNR values for the first application in relation to the first network.

The second application of block 222e may correspond to a 'lite' version of the first application (e.g., the second application may provide one or more functions in common with the first application, but the second application might not provide the same levels of data-richness as the first application), such that the second application may be more tolerant of a low-valued actual SNR. In some embodiments, execution of the second application by the UE as part of block 222e may supplement execution of the first application by the UE. Having the UE execute the second application as part of block 222e may be preferred to switching networks (compare block 222d of FIG. 2D) where, e.g., network conditions dictate avoiding switching networks.

While for purposes of simplicity of explanation, the respective processes are shown and described as a series of blocks in FIGS. 2C-2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Still further, while various aspects of the methods 200c, 200d, and 200e are described above separately for the sake of convenience, aspects of a first of the methods (e.g., the method 200c) may be implemented/practiced in conjunction with one or more aspects of the other methods (e.g., the method 200d and/or the method 200e). One or more aspects of the methods may be executed/implemented in conjunction with one or more of the systems, devices, or components described herein.

Aspects of the disclosure may be used to reduce (e.g., minimize) a likelihood that a UE will incur low throughput as a result of being connected to a first network (e.g., a 5G network) when a second network (e.g., a 4G/LTE network) may be able to provide a higher level of throughput. In this respect, the UE may be able to leverage features of the second network that would tend to enhance the user experience and UE device performance; such features may include, for example, multiple input multiple output (MIMO) technology, carrier aggregation (CA), licensed assisted access (LAA), etc.

As described herein, aspects of the disclosure may reduce the likelihood that a UE will attempt to repeatedly connect or reconnect to a given network due to a loss of link with that network. In this respect, UE crashes/reboots and power expenditure (e.g., battery depletion) may be reduced (e.g., minimized).

While some of the examples described herein were related to a use of SNR or SINR values/metrics, other types of values/metrics may be used to assess a quality of a link in a given network. Still further, combinations of values/metrics (e.g., an average of various values/metrics) may be used.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200a and/or the system 200b, and the method 200c, the method 200d, and/or the method 200e presented in FIGS. 1-2E. For example, virtualized communication network 300 can facilitate in whole or in part computing a first metric associated with a quality of an uplink between a user equipment and the device over a 5G network, computing a second metric associated with the quality of the uplink subsequent to the computing of the first metric, determining that there is a fault in the uplink, and responsive to the determining, computing a difference between the first metric and the second metric to generate an offset that is obtained by the user equipment for reconnecting the user equipment and the device over the 5G network. Virtualized communication network 300 can facilitate in whole or in part configuring a processing system with a first threshold associated with a connecting of the processing system to a network element over a 5G network, receiving a downlink transmission from the network element, detecting that the downlink transmission has a power level that is greater than the first threshold, responsive to the detecting, connecting the processing system to the network element over the 5G network, receiving an indication of an offset from the network element subsequent to the connecting of the processing system to the network element over the 5G network, wherein the receiving of the indication of the offset is based on a link failure between the processing system and the network element over the 5G network, and responsive to the receiving of the indication of the offset, configuring the processing system with a second threshold associated with the connecting of the processing system to the network element over the 5G network, wherein the second threshold is different from the first threshold. Virtualized communication network 300 can facilitate in whole or in part identifying, by a processing system including a processor, a first application executed by a user equipment, computing, by the processing system, a first metric associated with an uplink between the user equipment and a base station over a first network, comparing, by the processing system, the first metric with a second metric associated with the execution of the first application by the user equipment, and responsive to the comparing, causing, by the processing system, the user equipment to connect to the base station via a second network that is different from the first network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
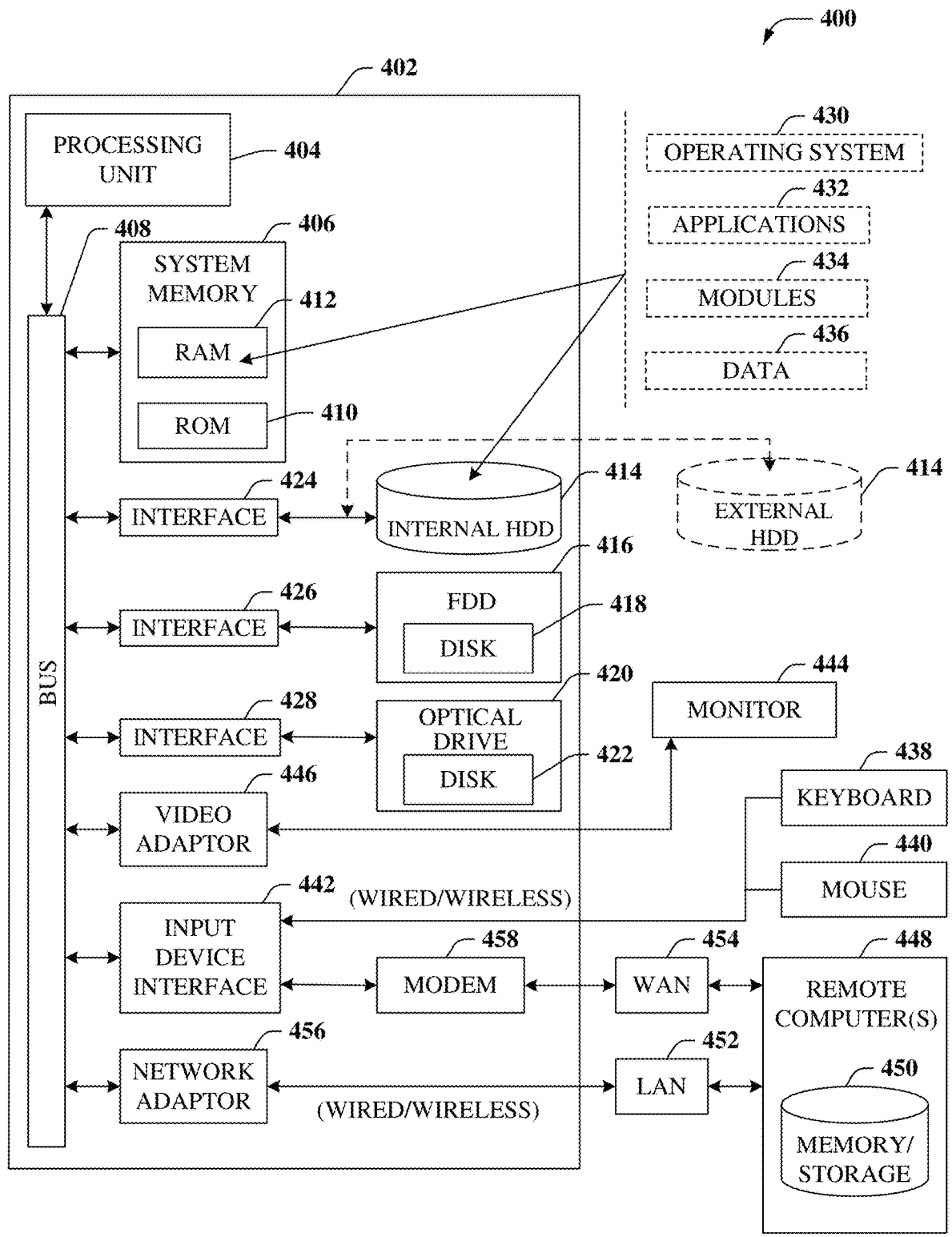
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part computing a first metric associated with a quality of an uplink between a user equipment and the device over a 5G network, computing a second metric associated with the quality of the uplink subsequent to the computing of the first metric, determining that there is a fault in the uplink, and responsive to the determining, computing a difference between the first metric and the second metric to generate an offset that is obtained by the user equipment for reconnecting the user equipment and the device over the 5G network. Computing environment 400 can facilitate in whole or in part configuring a processing system with a first threshold associated with a connecting of the processing system to a network element over a 5G network, receiving a downlink transmission from the network element, detecting that the downlink transmission has a power level that is greater than the first threshold, responsive to the detecting, connecting the processing system to the network element over the 5G network, receiving an indication of an offset from the network element subsequent to the connecting of the processing system to the network element over the 5G network, wherein the receiving of the indication of the offset is based on a link failure between the processing system and the network element over the 5G network, and responsive to the receiving of the indication of the offset, configuring the processing system with a second threshold associated with the connecting of the processing system to the network element over the 5G network, wherein the second threshold is different from the first threshold. Computing environment 400 can facilitate in whole or in part identifying, by a processing system including a processor, a first application executed by a user equipment, computing, by the processing system, a first metric associated with an uplink between the user equipment and a base station over a first network, comparing, by the processing system, the first metric with a second metric associated with the execution of the first application by the user equipment, and responsive to the comparing, causing, by the processing system, the user equipment to connect to the base station via a second network that is different from the first network.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
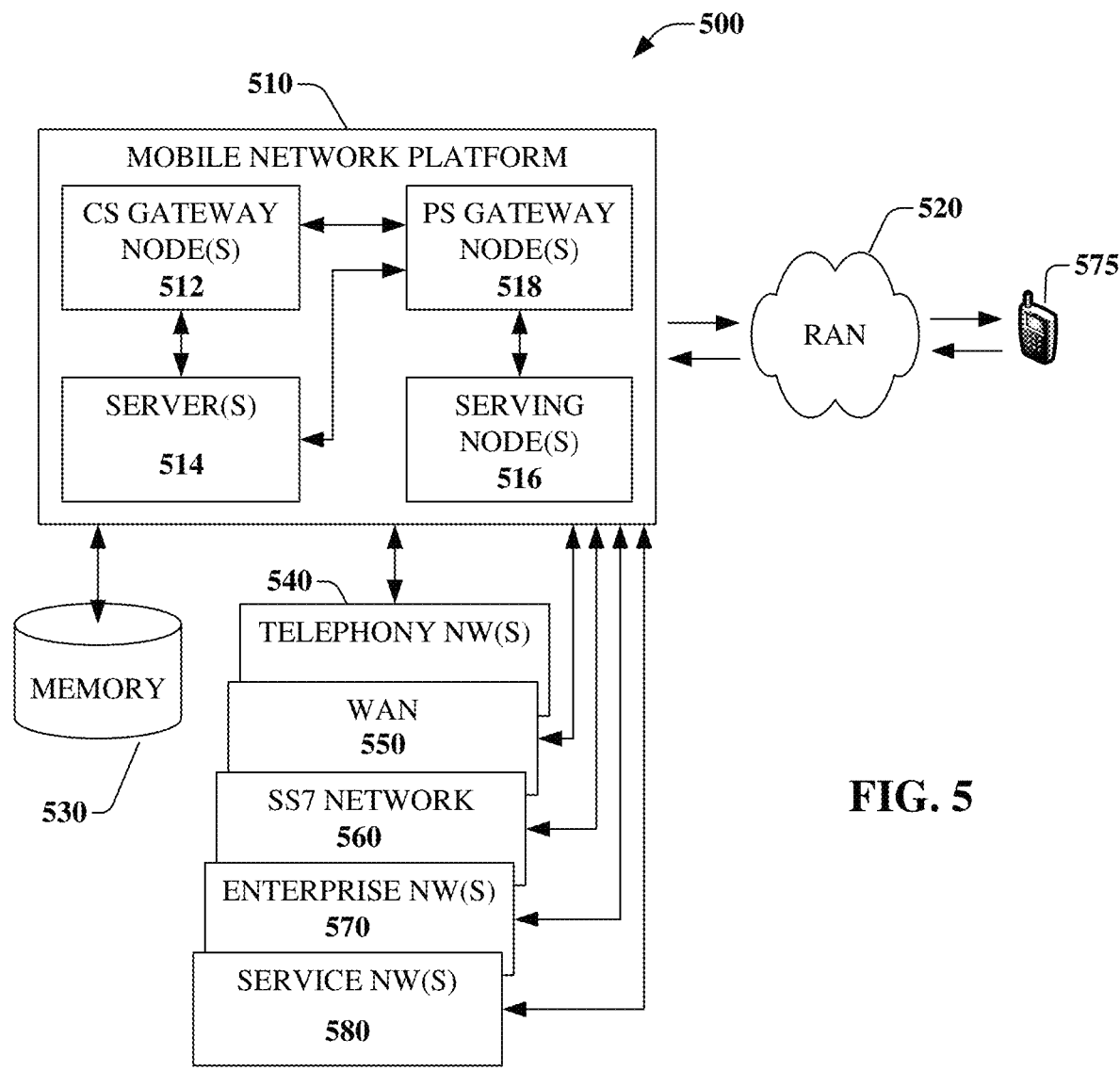
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part computing a first metric associated with a quality of an uplink between a user equipment and the device over a 5G network, computing a second metric associated with the quality of the uplink subsequent to the computing of the first metric, determining that there is a fault in the uplink, and responsive to the determining, computing a difference between the first metric and the second metric to generate an offset that is obtained by the user equipment for reconnecting the user equipment and the device over the 5G network. Platform 510 can facilitate in whole or in part configuring a processing system with a first threshold associated with a connecting of the processing system to a network element over a 5G network, receiving a downlink transmission from the network element, detecting that the downlink transmission has a power level that is greater than the first threshold, responsive to the detecting, connecting the processing system to the network element over the 5G network, receiving an indication of an offset from the network element subsequent to the connecting of the processing system to the network element over the 5G network, wherein the receiving of the indication of the offset is based on a link failure between the processing system and the network element over the 5G network, and responsive to the receiving of the indication of the offset, configuring the processing system with a second threshold associated with the connecting of the processing system to the network element over the 5G network, wherein the second threshold is different from the first threshold. Platform 510 can facilitate in whole or in part identifying, by a processing system including a processor, a first application executed by a user equipment, computing, by the processing system, a first metric associated with an uplink between the user equipment and a base station over a first network, comparing, by the processing system, the first metric with a second metric associated with the execution of the first application by the user equipment, and responsive to the comparing, causing, by the processing system, the user equipment to connect to the base station via a second network that is different from the first network.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
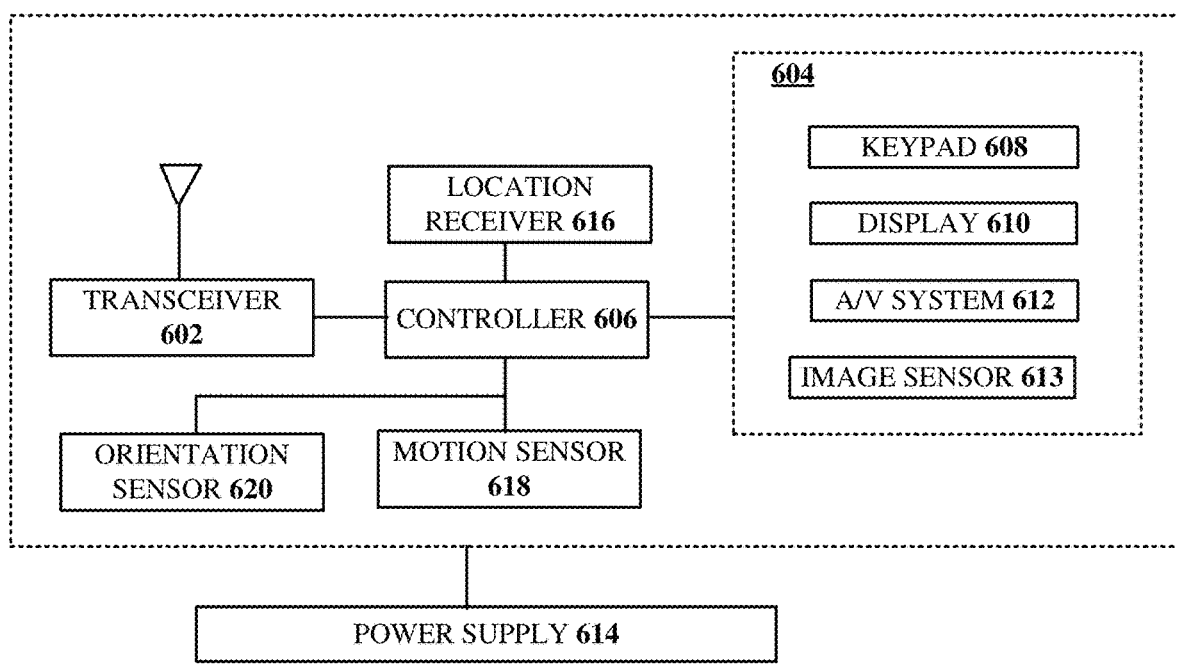
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part computing a first metric associated with a quality of an uplink between a user equipment and the device over a 5G network, computing a second metric associated with the quality of the uplink subsequent to the computing of the first metric, determining that there is a fault in the uplink, and responsive to the determining, computing a difference between the first metric and the second metric to generate an offset that is obtained by the user equipment for reconnecting the user equipment and the device over the 5G network. Computing device 600 can facilitate in whole or in part configuring a processing system with a first threshold associated with a connecting of the processing system to a network element over a 5G network, receiving a downlink transmission from the network element, detecting that the downlink transmission has a power level that is greater than the first threshold, responsive to the detecting, connecting the processing system to the network element over the 5G network, receiving an indication of an offset from the network element subsequent to the connecting of the processing system to the network element over the 5G network, wherein the receiving of the indication of the offset is based on a link failure between the processing system and the network element over the 5G network, and responsive to the receiving of the indication of the offset, configuring the processing system with a second threshold associated with the connecting of the processing system to the network element over the 5G network, wherein the second threshold is different from the first threshold. Computing device 600 can facilitate in whole or in part identifying, by a processing system including a processor, a first application executed by a user equipment, computing, by the processing system, a first metric associated with an uplink between the user equipment and a base station over a first network, comparing, by the processing system, the first metric with a second metric associated with the execution of the first application by the user equipment, and responsive to the comparing, causing, by the processing system, the user equipment to connect to the base station via a second network that is different from the first network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        computing a first metric associated with a quality of an uplink between a user equipment and the device over a first network;
        computing a second metric associated with the quality of the uplink subsequent to the computing of the first metric;
        determining that there is a fault in the uplink; and
        responsive to the determining, computing a difference between the first metric and the second metric to generate an offset that is obtained by the user equipment for reconnecting the user equipment and the device over the first network.

2. The device of claim 1, wherein the first metric and the second metric each comprise a signal to noise ratio, a signal to interference noise ratio, or a combination thereof.

3. The device of claim 1, wherein the determining that there is the fault in the uplink comprises determining that there is a count of failures in the uplink in an amount that is greater than a threshold.

4. The device of claim 1, wherein the determining that there is the fault in the uplink comprises determining that there is a rate of failures in the uplink that exceeds a threshold over a predetermined period of time.

5. The device of claim 1, wherein the operations further comprise:
    transmitting the offset to the user equipment.

6. The device of claim 5, wherein the transmitting of the offset to the user equipment causes the user equipment to connect to the first network subsequent to the fault in the uplink when a downlink transmission power between the device and the user equipment is greater than a first threshold.

7. The device of claim 6, wherein the first threshold corresponds to a summation of a second threshold and the offset, and wherein the user equipment and the device were connected to one another over the first network via the uplink when the downlink transmission power was greater than the second threshold and less than the first threshold.

8. The device of claim 1, wherein the operations further comprise:
    transmitting the difference between the first metric and the second metric to the user equipment to cause the user equipment to determine the offset.

9. The device of claim 1, wherein the operations further comprise:
    responsive to the determining, causing the user equipment to connect to the device over a second network.

10. A non-transitory machine-readable medium, comprising executable instructions that, when executed by a processing system including a processor, facilitate performance of operations, the operations comprising:
    computing a first metric associated with a quality of a link between a user equipment and the processing system over a first network;

computing a second metric associated with the quality of the link subsequent to the computing of the first metric;

determining that there is a fault in the link; and responsive to the determining, computing a difference between the first metric and the second metric to generate an offset that is obtained by the user equipment for reconnecting the user equipment and the processing system over the first network.

11. The non-transitory machine-readable medium of claim 10, wherein the first metric and the second metric each comprise a signal to noise ratio, a signal to interference noise ratio, or a combination thereof.

12. The non-transitory machine-readable medium of claim 10, wherein the determining that there is the fault in the link comprises determining that there is a count of failures in an uplink in an amount that is greater than a threshold.

13. The non-transitory machine-readable medium of claim 10, wherein the determining that there is the fault in the link comprises determining that there is a rate of failures in an uplink that exceeds a threshold over a predetermined period of time.

14. The non-transitory machine-readable medium of claim 10, wherein the operations further comprise:

transmitting the offset to the user equipment.

15. The non-transitory machine-readable medium of claim 14, wherein the transmitting of the offset to the user equipment causes the user equipment to connect to the first network subsequent to the fault in the link when a downlink transmission power between the processing system and the user equipment is greater than a first threshold.

16. The non-transitory machine-readable medium of claim 15, wherein the link corresponds to an uplink, and wherein the first threshold corresponds to a summation of a second threshold and the offset, and wherein the user equipment and the processing system were connected to one another over the first network via the uplink when the downlink transmission power was greater than the second threshold and less than the first threshold.

17. The non-transitory machine-readable medium of claim 10, wherein the operations further comprise:

transmitting the difference between the first metric and the second metric to the user equipment to cause the user equipment to determine the offset.

18. The non-transitory machine-readable medium of claim 10, wherein the operations further comprise:

responsive to the determining, causing the user equipment to connect to the processing system over a second network.

19. A method comprising:

computing, by a processing system including a processor, a first metric associated with a quality of an uplink between a user equipment and a device over a first network;

computing, by the processing system, a second metric associated with the quality of the uplink subsequent to the computing of the first metric;

determining, by the processing system, that there is a fault in the uplink; and responsive to the determining, computing, by the processing system, a difference between the first metric and the second metric to generate an offset that is obtained by the user equipment for reconnecting the user equipment and the device over the first network.

20. The method of claim 19, wherein the determining that there is the fault in the uplink comprises determining that there is a count of failures in the uplink in an amount that is greater than a threshold.

* * * * *